July 6, 1926.
J. G. CAPSTAFF
PHOTOGRAPHIC PRINTER
Filed March 9, 1922    5 Sheets-Sheet 1
1,591,466
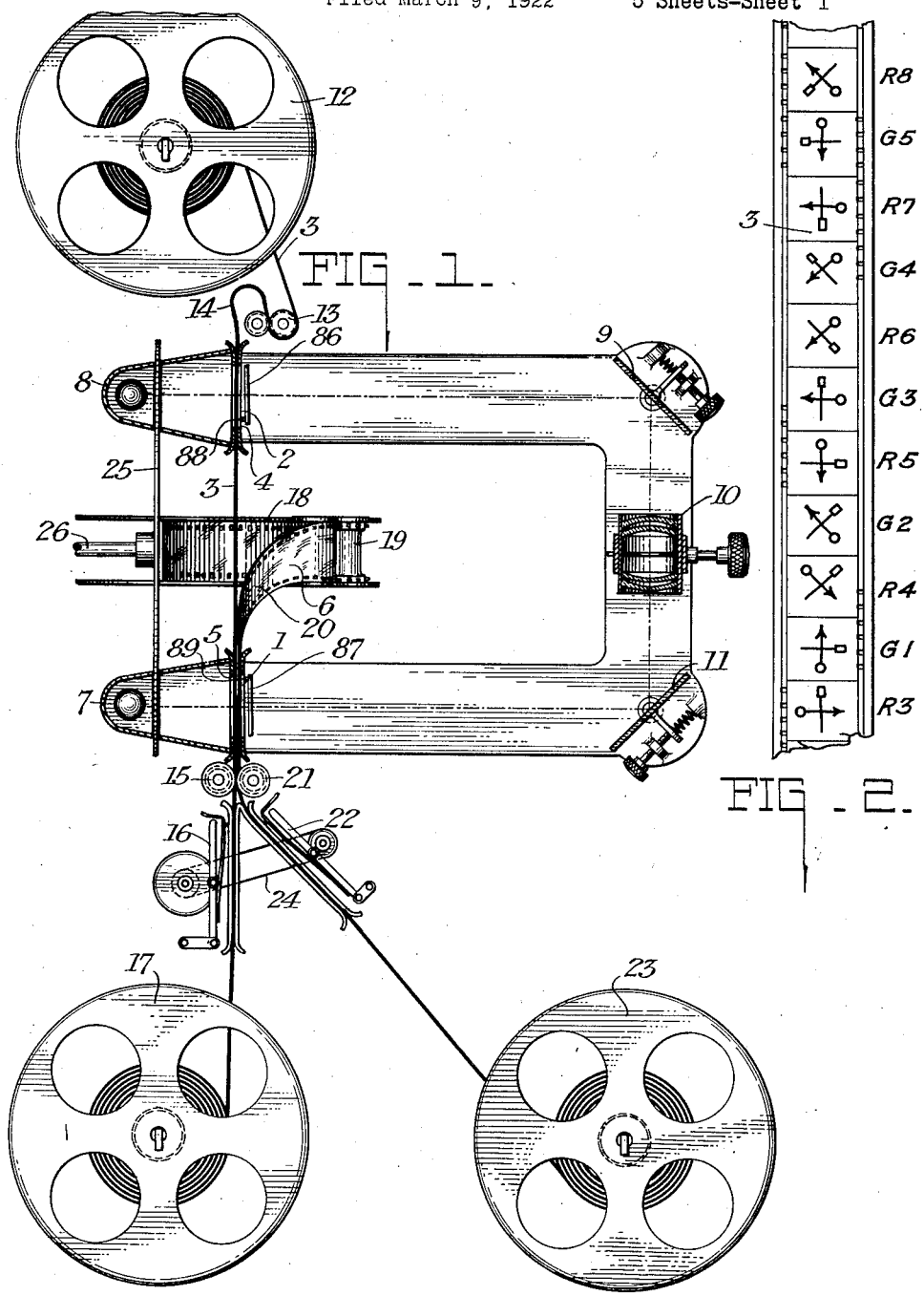
WITNESS
INVENTOR
John G. Capstaff,
BY
ATTORNEYS.

July 6, 1926.
J. G. CAPSTAFF
PHOTOGRAPHIC PRINTER
Filed March 9, 1922
1,591,466
5 Sheets-Sheet 3
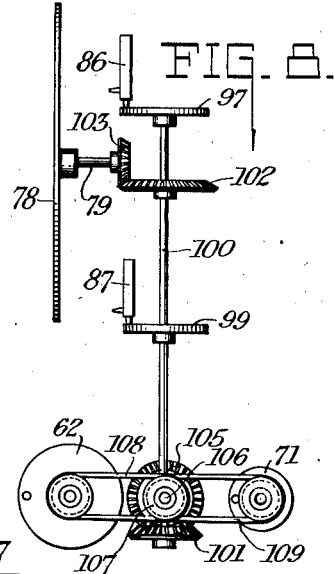
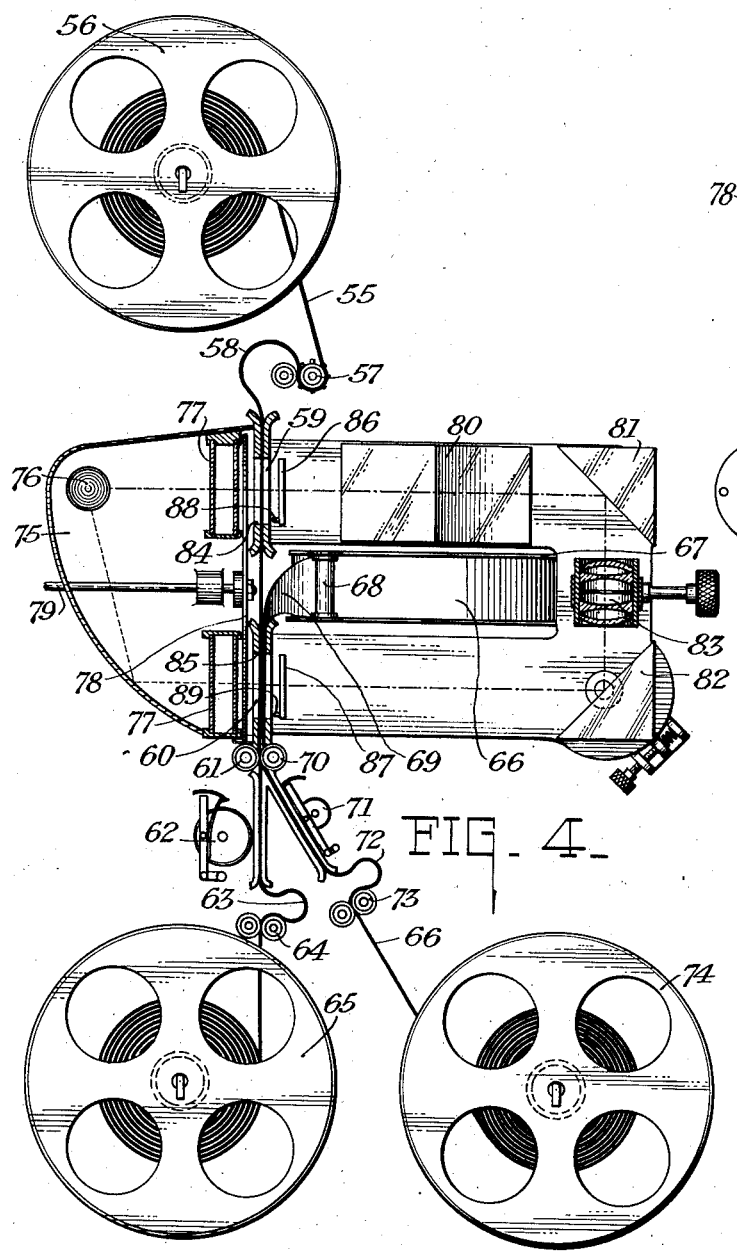
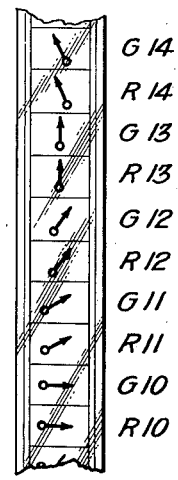
WITNESS
INVENTOR
John G. Capstaff,
BY
ATTORNEY July 6, 1926. 1,591,466
J. G. CAPSTAFF
PHOTOGRAPHIC PRINTER
Filed March 9, 1922 5 Sheets-Sheet 4
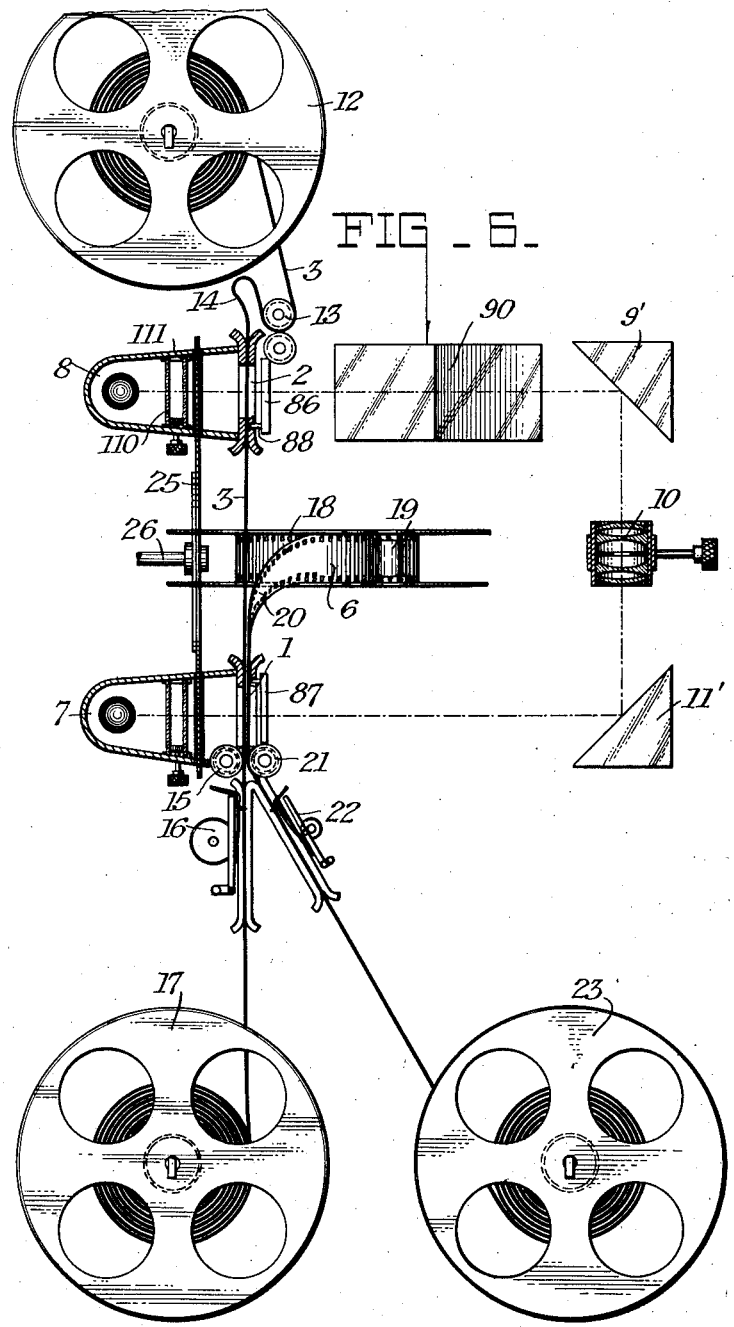
WITNESS
INVENTOR
John G. Capstaff,
BY
ATTORNEYS.

July 6, 1926.
J. G. CAPSTAFF
1,591,466
PHOTOGRAPHIC PRINTER
Filed March 9, 1922      5 Sheets-Sheet 5
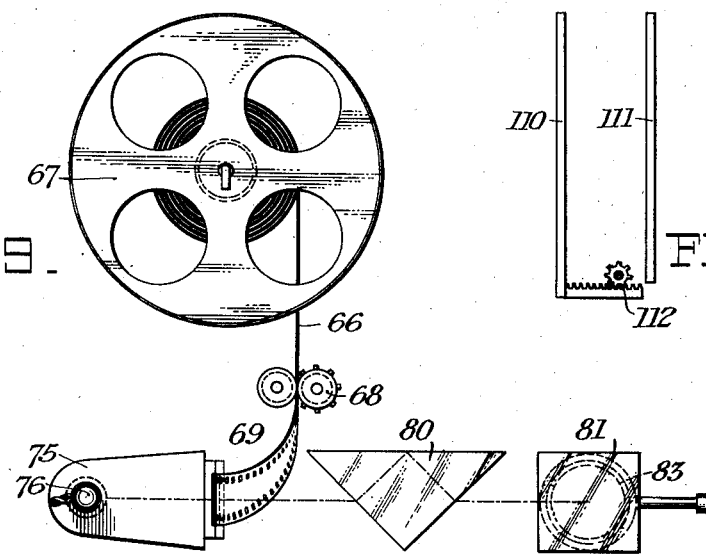
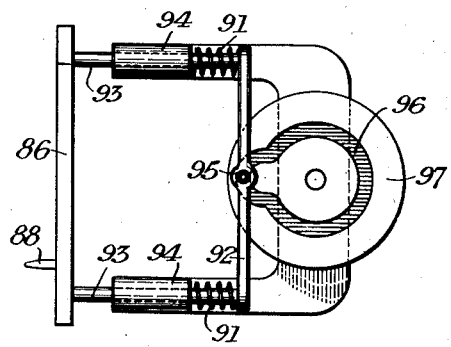
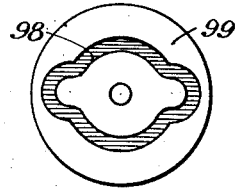
WITNESS
INVENTOR
John G. Capstaff,
BY
ATTORNEYS.

Patented July 6, 1926.

1,591,466

UNITED STATES PATENT OFFICE.

JOHN G. CAPSTAFF, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC PRINTER.

Application filed March 9, 1922. Serial No. 542,449.

This invention relates to improvements in photographic printers and more particularly to printers of a design adapted to reproduce upon a motion picture film registering images from two series of color component records. In all of the forms of my invention one series of images is printed by contact and the other by projection, preferably upon opposite sides of a double coated film, thereby giving certain advantages in registry and simplicity over the forms of printers hitherto known. The advantages, objects and details of the methods and apparatus which make up my invention will be clear from an inspection of the specification following and of the claims attached thereto.

Reference will now be made to the appended drawings in which the same reference characters refer to the same parts throughout, and in which:—

Fig. 1 represents a side view of one form of my improved printer;

Fig. 2 shows the printing film used in this printer;

Fig. 4 is a side view of another embodiment of my invention;

Fig. 5 shows the printing film used therein;

Fig. 6 is a side view of still another modification of my invention;

Fig. 7 shows the printing film used therein;

Fig. 8 is a schematic showing of the movable parts of the printers shown in certain figures, intended to show the timed relation of their movement;

Fig. 9 is a plan view of certain portions of the forms shown in Figs. 4 and 6;

Figs. 10, 11 and 12 shows details of the mechanism.

Figure 3:
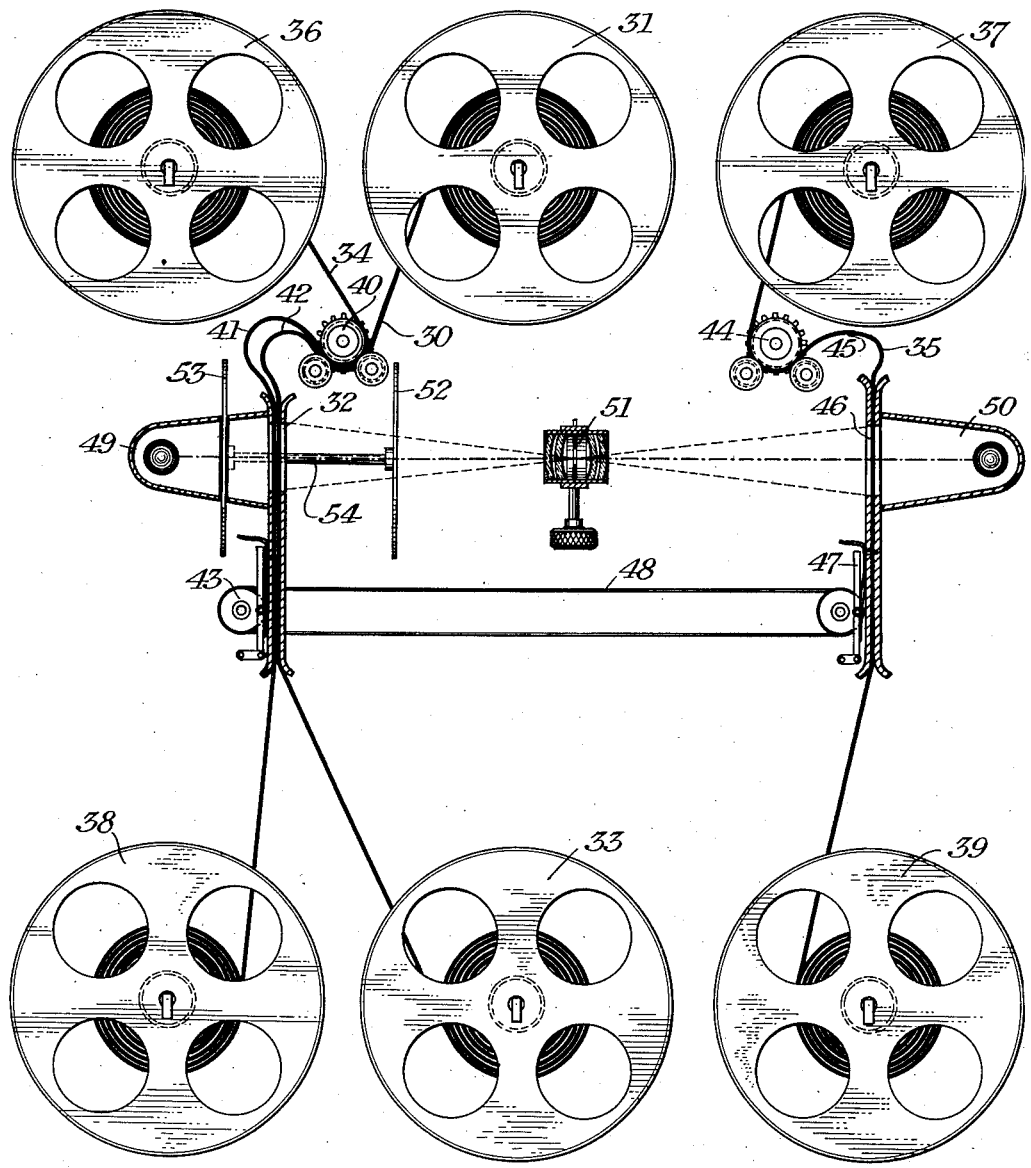
Fig. 3 is a side view of a second embodiment of my invention.

It is to be understood that in all of the figures I have purposely made the showing largely diagrammatic or schematic, with some parts shown in section, so that the optical principles which underlie it and which constitute the real features of my invention may be clear. It is obvious that the mechanical details are in a large part those which are standard practice in this art, and a complete showing thereof would merely obscure the actual invention. The present showing is, however, sufficient for any one skilled in the art to make and use the invention.

In Fig. 1 there is shown a printer having two gates 1 and 2, past both of which a single printing film 3, containing two series of complementary color images of the same scene, is drawn. The distance between the lower edge 4 of the exposure opening in printing gate 2 and the upper edge 5 of the exposure opening in printing gate 1 is such that there is room for four exposure areas of the film. Past the first printing gate 1 there is also drawn a sensitized motion picture film 6, preferably carrying on each surface a sensitive emulsion. Two lamp houses 7 and 8 are placed adjacent the printing gates. One of these lamp houses is adapted to be used to print an image from the printing film 3 upon the sensitive film 6 at gate 1, while the other lamp house is used to project an image from the printing film 3 at gate 2 upon an adjustable reflector 9, thence through an adjustable projecting lens 10 and thence from another adjustable reflector 11 upon the sensitive film 6 at gate 1. The printing film 3 is drawn from supply reel 12 by means of a constantly rotating driving sprocket 13 to form a loop at 14 and thence through both gates and guide roll 15 by means of an intermittent pulldown of any type 16 which draws it a distance of two exposure areas at each movement. It is then wound up on the reel 17. The positive film is supplied from a reel 18 by a driving sprocket 19, the loop being formed at 20. It is intermittently drawn past the gate and the guide roll 21 by means of the intermittent pulldown 22, which draws it a single picture area at each operation, and is then wound up on reel 23. The pulldown mechanisms 16 and 22 are shown in a schematic manner only, and the connecting belt 24 indicates that they operate synchronously, both pulldowns operating simultaneously,— one for a double pulldown and the other for a single one.

It is obvious that with this optical system a point at the bottom of the exposure area at the gate 2 will be projected also upon the bottom of gate 1, while a point near one side edge of the gate 2 will be projected at the opposite side edge of gate 1,—that is, the projected image will be inverted laterally but not vertically. Accordingly, the printing negative necessary to obtain registering images will be of the type shown in Fig. 2 in which corresponding images are inverted laterally but not vertically. Corresponding images are indicated as $R^3$, $G^3$; $R^4$, $G^4$; $R^5$, $G^5$; etc. Since the film is indicated as fragmentary, only single components of some of the pairs appear. A sector disk shutter 25 of familiar type, carried by a driving shaft 26, and with opposite sector openings exposes printing light from the two lamp houses simultaneously when both films are at rest.

The operation of this apparatus is obvious. Assuming the images $R^3$ and $G^3$ are at rest in the two exposure gates, the image $R^3$ will be printed by contact upon one surface of a picture area of the sensitive film thereat, and the corresponding complementary image at the film gate 2 will be printed by projection in registry with the contact printed image upon the opposite surface of the sensitive film at gate 1. The films will then be moved, the printing film being drawn down two areas, bringing the corresponding images $R^4$ and $G^4$ to the gates, while the sensitive film will be drawn down by a single picture area, bringing the next unexposed picture area to the printing gate 1. The printing lights will be shut off by the shutter during this movement.

In the form shown in Fig. 3 a double coated sensitive film 30 is drawn from a supply reel 31 to the take-up reel 33. There are two printing films 34 and 35, one containing one series of color records, and the other carrying the complementary series, these being drawn from supply reels 36 and 37 respectively, to take-up reels 38 and 39 respectively. The printing film 34 and the sensitive film 30 are advanced by the constant feed 40 and form loops 41 and 42, and then are drawn in contact past the gate 32 by means of the pulldown mechanism 43. The other printing film 35 is drawn through the constant feed 44 and forms a loop 45, and then is drawn through the printing gate 46 by means of any suitable type of pulldown mechanism 47, the mechanism 43 and 47 being operated synchronously, this being indicated by the driving belt 48. Lamp houses 49 and 50 are suitably situated with reference to the two gates, so that an image on film 34 is printed by contact upon one side of the sensitive film 30, while simultaneously an image on the printing film 45 at the gate 46 is printed by projection through the adjustable lens 51 upon the other side of the sensitive film at the gate 32. Two sector shutters, 52 and 53, carried by a common shaft 54 simultaneously cut off the light during the movement of the film. In this case each of the films is advanced by a single picture area at each actuation.

In the apparatus shown in Fig. 4 there is adapted to be used a printing film 55 having adjacent pairs of complementary color records similarly positioned on their respective picture areas, these being designated in Fig. 5 as $R^{10}$, $G^{10}$; $R^{11}$, $G^{11}$; etc. The printing film is drawn from the supply reel 56 past the constant feed means 57 to form a loop at 58 and thence through a projection gate 59 and a contact gate 60, past the guide roll 61 to the intermittent pulldown mechanism 62 forming a loop at 63, from which it is advanced by the constant feed means 64 to the take-up reel 65. The sensitive film 66 is drawn from the supply reel 67 past a constant feed means 68 to form a loop at 69, through the contact gate 60 and guide roll 70 and the pulldown mechanism 71, forming a loop at 72, and past the constant feed means 73 to the take-up reel 74. Light is furnished both gates from a common lamp house 75 having a single lamp 76, there being diffusing sheets 77 in front of each gate. Two pulldowns work alternately, and the shutter 78, mounted on shaft 79, is designed to expose first one gate and then the other during the period of dwell. It is necessary to invert the projected image laterally, and this is done by the inverting prism 80, the image being reflected from the reflecting prisms 81 and 82 and the projecting lens 83, these being adjustable to secure proper registration of the images. The lower edge 84 of the exposure window at gate 59 is distant from the upper edge 85 of the exposure window at the gate 60 by a distance corresponding to two picture areas. Pressure plates 86 and 87, carrying registry pins 88 and 89, serve to hold the films in registry in proper contact at the contact gate, as in the other forms.

The operation of this apparatus is as follows: assuming that record $G^{11}$ is opposite gate 59 while record $R^{10}$ is opposite the printing gate 60, the record $G^{11}$ is now printed by projection upon one surface of the sensitive film, the shutter meanwhile shutting off light from the record $R^{10}$ at the lower gate. The printing film is then advanced by two picture areas, the sensitive film not being moved. This brings record $R^{11}$ opposite the lower gate and record $G^{12}$ opposite the upper gate. The record $R^{11}$ is now printed by contact upon the other surface of the sensitive film, the shutter cutting off light from the upper gate. The sensitive film is now advanced by one picture area, the printing film 55 not being moved. The record $G^{12}$ is now printed by projection upon the fresh sensitive area, and the cycle proceeds as described. This form, therefore, renders possible the use of a film having the convenient arrangement shown in Fig. 5.

The form shown in Fig. 6 is similar in every way to the form shown in Fig. 1, except that a lateral inverting prism 90 is used, and that the reflectors comprise prisms 9' and 11'.

This form will, therefore, not be described in detail, the same parts being given the same reference characters as in that figure. The film used with this design is shown in Fig. 7, the corresponding images being separated by four picture areas and designated $R^{20}$, $G^{20}$; $R^{21}$, $G^{21}$; etc.

Fig. 9 illustrates the position of the supply reel, here indicated as 67, for the sensitive film 66. The reference characters are those used on Fig. 4, but it is to be understood that the arrangement is similar to that employed in Figs. 1, 4 and 6.

In Fig. 11, I have indicated a way in which the pressure gate 86 and registry pin 88 at the projection gate may be moved back and forth. These are normally withdrawn by springs 91 bearing against a common yoke 92 carrying pins 93 rigid with the presser plate, the springs bearing against fixed lugs 94. The presser plates are pressed forward in position by a pin 95 on the yoke 92 engaging in a slot 96 in a cam plate 97. A corresponding slot 98 in another cam plate 99 is used for a similar mechanism with the lower gate, this cam slot operating the pin twice to a single actuation of the presser plate in the upper gate.

In Fig. 8 there is illustrated a schematic driving relation of the different parts. It is to be understood that this is not intended to show the actual structure, but to illustrate in a graphic way their relation so that it can be readily understood. A constantly driven shaft 100 carries bevel gears 101 and 102 and cam plates 97 and 99, these latter being of the type shown in Figs. 11 and 12. The bevel gear 101 drives a gear 105 which operates a shaft 106 driving by means of pulleys 107 and belts 108 and 109 the take-up mechanisms 62 and 71. The bevel gear 102 drives by means of a gear 103 the shaft 79 and shutter 78. The cams 97 and 99 actuate the presser plates 86 and 87. While I have employed in connection with Fig. 8 the reference characters with reference to Fig. 4, it is to be understood that the timed relation of the parts is analogous in the several forms.

It is well known that different degrees of contrast are obtained when printing from similar light sources by contact or projection. I, therefore, propose to use in all of the forms of my contact printer, though not completely shown, all means for controlling the contrast. The means which I have here shown consists of separated plates 110 and 111, one of which is movable relative to the other by means of a rack and pinion 112. This adjustment of the two diffusing screens varies the diffusion of the light and affects very markedly the contrast of the resulting image. I have, therefore, a means by which the contrast may be controlled. Other means can be substituted for this expedient.

It is obvious that numerous other systems involving the principles here pointed out are possible, and I contemplate all such modification and equivalents as within the scope of my invention as defined in the appended claims.

Having thus described my invention, what I claim as new and desire to secure by Letters Patent is:—

1. The method of making a colored photographic image that comprises making two different color records of the same object, holding a sensitized element in a fixed printing position, printing in one operation both color records in registry, one by contact and the other by projection, on the said sensitized element when so held, and transforming the two printed records into suitable colored records.

2. The method of printing two series of corresponding records upon the same strip of sensitive film, which consists in passing a strip of sensitive film through a gate, exposing successive areas thereof at the gate to images projected from one series of records, and at the same gate and as a part of the same operation printing by contact images from the corresponding members of the other series of records on the same areas.

3. In the art of color photography, the improvement in the production of color positives which consists in projecting upon one side of a film sensitized on both sides an image from a negative film having complementary images of an object, and in the same operation printing by contact on the other side of the sensitized film and in suitable registry with the first a complementary image from the same negative film, and transforming the two images thus recorded into suitable colored records.

4. In the art of color motion picture photography, the improvement in the production of color positives which consists in projecting upon one side of a long strip of film sensitized on both sides a series of images from a negative film having two complementary series of images of a scene, and in the same operation printing by contact on the other side of the sensitized film and in suitable registry with the first series, a second series of complementary images from the same negative film.

5. In a photographic printer, a first gate, a second gate, means for drawing intermittently and in timed relation two films past the first gate and a single film past the second gate, and means for printing images by contact from one of the two films upon the other of the two films at the first gate and by projection from the single film at the second gate to the other of the two films at the first gate.

6. In a photographic printer, a first gate, a second gate, means for drawing intermittently and in timed relation two films past the first gate and a single film past the second gate, means for printing images by contact from one of the two films upon the other of the two films at the first gate, and by projection from the single film at the second gate to the other of the two films at the first gate, and shutter means operating in timed relation to the film drawing means for controlling both printing operations.

7. In a photographic printer, two gates, means for drawing two films past one gate and a single film past the other gate, means for printing images by contact from one of the two films upon the other of the two films while both are at the first film gate, and by projection from the single film at the second gate upon the other of the two films while the other film is at the first film gate, and means for positioning the films at the gates during the printing operations.

8. In a photographic printer, a first gate, a second gate, means for drawing intermittently and in timed relation two films past the first gate and a single film past the second gate, means for printing images by contact from one of the two films upon the other of the two films at the first gate, and by projection from the single film at the second gate to the other of the two films at the first gate, shutter means operating in timed relation to the film drawing means for controlling both printing operations, and means for positioning the films at the gates during the printing operations.

9. In a photographic printer, a first gate, a second gate, means for moving film containing two series of complementary color images past said gates, means for moving sensitized film past said first gate, means for printing one series of said images upon said sensitive film by contact from one side at said first gate, and means for printing the other series of said images at the second gate upon the sensitive film at the first gate by projection from the other side.

10. In a photographic printer, a first gate, a second gate, means for moving a strip of film containing two series of records intermittently past said gates, one series of records having a dwell at the first gate and the other series of records having a dwell at the second gate, means for moving intermittently a strip of sensitized film past said first gate in timed relation to the movement of the first strip, and means for printing by contact from one of said series of records upon said sensitized film at said first gate and by projection from the other series of records at the second gate upon said sensitized film at said first gate.

11. The method of controlling the contrast of two light images presented on a sensitive film after passage through two complementary color record images that consists in controlling independently the diffusion of the light falling upon each record image.

12. Means for supporting a sensitive element in light printing position, means for supporting two complementary color records in printing position with respect to said sensitive element, means for directing printing light through each of said records upon said sensitive element and means for controlling independently the degree of diffusion of the light falling upon the records.

Signed at Rochester, New York, this 2nd day of March 1922.

JOHN G. CAPSTAFF.